(12) United States Patent
Won et al.

(10) Patent No.: US 10,414,691 B2
(45) Date of Patent: Sep. 17, 2019

(54) ARCHED STEEL FIBERS FOR REINFORCING CEMENT-BASED MATERIAL

(71) Applicant: KOSTEEL CO., LTD., Seoul (KR)

(72) Inventors: Jong Pil Won, Seoul (KR); Su Jin Lee, Geoje-Si (KR); Jae Ho Lee, Incheon (KR); Ryang Woo Kim, Seoul (KR); Kwang Soo Kim, Seoul (KR)

(73) Assignee: KOSTEEL CO., LTD., Seoul (KR)

( * ) Notice: Subject to any disclaimer, the term of this patent is extended or adjusted under 35 U.S.C. 154(b) by 266 days.

(21) Appl. No.: 15/510,305

(22) PCT Filed: Jan. 22, 2015

(86) PCT No.: PCT/KR2015/000674
§ 371 (c)(1),
(2) Date: Mar. 10, 2017

(87) PCT Pub. No.: WO2016/047870
PCT Pub. Date: Mar. 31, 2016

(65) Prior Publication Data
US 2017/0283320 A1    Oct. 5, 2017

(30) Foreign Application Priority Data

Sep. 24, 2014    (KR) .................. 10-2014-0127460

(51) Int. Cl.
*B21D 13/10*    (2006.01)
*E04C 2/30*    (2006.01)
(Continued)

(52) U.S. Cl.
CPC .............. *C04B 14/48* (2013.01); *C04B 14/38* (2013.01); *E04C 5/012* (2013.01); *Y10T 428/1241* (2015.01)

(58) Field of Classification Search
CPC . C04B 14/38; C04B 14/48; E04C 5/01; E04C 5/012; E04C 5/073; Y10T 428/12354; Y10T 428/1241
See application file for complete search history.

(56) References Cited

U.S. PATENT DOCUMENTS 2,705,897 A * 4/1955 Kentish ................. B25B 13/463
                                                           81/119
4,420,153 A * 12/1983 Winkler ................. B65H 3/063
                                                           271/202
(Continued)

FOREIGN PATENT DOCUMENTS

EP         0484531 A1 * 5/1992 ............ E04C 5/012
JP         06-294017       10/1994
(Continued)

*Primary Examiner* — Seth Dumbris
(74) *Attorney, Agent, or Firm* — Lex IP Meister, PLLC

(57) ABSTRACT

The present invention discloses an arched steel fiber for reinforcement of a cement-based material, of which a main body is arched in a length direction and opposite ends of the main body are curved such that the steel fiber has a higher pullout resistance strength compared to a conventional steel fiber, thereby improving mechanical performance such as a tensile strength, a flexural strength, an energy absorption capability, and the like of a cement compound. In addition, compared to a conventional art, a mixing amount of steel fiber to performance can be reduced so that an added economic value in terms of consumable cost can be created.

1 Claim, 7 Drawing Sheets

(51) Int. Cl.
*C04B 14/48* (2006.01)
*C04B 14/38* (2006.01)
*E04C 5/01* (2006.01)

(56) References Cited

U.S. PATENT DOCUMENTS

| | | | | |
|---|---|---|---|---|
| 4,764,488 | A * | 8/1988 | Saito | C04B 35/76 |
| | | | | 428/364 |
| 6,060,163 | A | 5/2000 | Naaman | |
| 9,045,901 | B2 * | 6/2015 | Lambrechts | E04C 5/012 |
| 2013/0255540 | A1 * | 10/2013 | Lambrechts | E04C 5/012 |
| | | | | 106/644 |

FOREIGN PATENT DOCUMENTS

| | | |
|---|---|---|
| KR | 10-2002-0081706 | 10/2002 |
| KR | 20-0361900 | 9/2004 |
| KR | 200361900 | 9/2004 |
| KR | 2004406191 | 1/2006 |
| KR | 10-2011-0050628 | 5/2011 |
| KR | 10-2011-0051914 | 5/2011 |
| KR | 101073393 | 10/2011 |
| KR | 20130129385 | 11/2013 |
| KR | 10-1403659 | 6/2014 |
| KR | 101403659 | 6/2014 |

\* cited by examiner

ARCHED STEEL FIBERS FOR REINFORCING CEMENT-BASED MATERIAL

TECHNICAL FIELD

The present invention relates to arched steel fiber for reinforcement of a cement-based material. More particularly, it relates to arched steel fiber that can improve mechanical characteristics such as crack control, impact resistance, flexural toughness, and the like by increasing adhesion force in mixing with a cement-based composition by forming curved ends at opposite ends of the arched steel fiber.

BACKGROUND ART

In general, concrete has excellent compression strength, durability, and hardness, but has low tensile strength, flexural strength, impact strength, and energy absorption capability, thereby having weak limits under tensile or dynamic loading.

In order to ameliorate such a weakness, a method for reinforcing cement by using a predetermined steel fiber has been widely used, and the size of the steel fiber and a mixing amount of the steel fiber are adjusted depending on the application.

Various types of steel fiber related technologies, such as straight steel fiber having hooked ends and a circular cross-section disclosed in Korean Patent Laid-Open Publication No. 2013-0129385, ring-shaped steel fiber of which opposite ends are disposed apart from each other to improve flexural toughness by reducing a rebound rate when depositing and preventing extraction after depositing, and the like, have been disclosed until now.

As described, a conventional concrete reinforcing steel fiber has been applied to shotcrete, which is a secondary passive reinforcing member, in tunnel excavation, and is commonly applied to a floor slab which requires crack control and has a difficulty in reinforcement using steel bars due to its small cross-section.

Steel fiber applied to the shotcrete has a diameter of 0.5 mm to 0.55 mm and a length of 30 mm to 35 mm, but steel fiber applied to the floor slab usually has a diameter of 0.75 mm to 0.90 mm and a length of 50 mm to 60 mm.

In a case of a conventional hooked steel fiber which is as shown in FIG. 7, opposite ends of a straight main body are generally formed in the shape of a hook by bending the opposite ends at a predetermined angle. This is because, when the steel fiber is pulled out from the concrete due to a tensile force applied thereto after a crack is generated, adhesion performance is deteriorated since there is a significant deterioration of pullout resistance strength in the straight portion, except for the hooked portion. Accordingly, the conventional hooked steel fiber cannot improve mechanical performance.

In order to solve such a problem, various techniques that implement characteristics have been disclosed in Korean Patent No. 1,073,393, Korean Utility Nos. 361,900 and 406,191, and U.S. Pat. No. 6,060,163.

However, the conventional concrete reinforcing steel fiber, specifically, steel fibers that are designed for improvement adhesion performance, require a relatively short length or high tensile strength so as to improve adhesion performance.

In particular, in case of steel fiber having ring-shaped separated ends like the steel fiber disclosed in Korean Patent Laid-Open Publication No. 1,403,659, the ring-shaped separated ends are disposed higher than a center portion and each end is provided with a closely attached portion that protrudes inwardly and downwardly with an inclination. However, circular-shaped opposite ends need a lapped welding treatment, which may cause quality deterioration or productivity deterioration due to a welding failure.

DISCLOSURE

Technical Problem

The present invention has been made in an effort to provide an arched steel fiber for reinforcement of a cement-based material for improvement of mechanical performance between steel fiber and the cement-based material by integrally forming curved ends to opposite ends of the main body.

In addition, the present invention can provide the arched steel fiber for reinforcement of the cement-based material that can create added economic value in terms of consumable cost by reducing a mixing amount of steel fiber to performance.

Technical Solution

An arched steel fiber for reinforcement of a cement-based material according to an exemplary embodiment of the present invention includes an arched main body having a curvature radius and curved and straight ends respectively provided at opposite ends of the main body.

Particularly, the curved ends are bent in a direction that is opposite to a direction that the main body is arched, and the straight ends are continued to the curved ends, respectively.

Advantageous Effects

According to the exemplary embodiment of the present invention, the opposite ends of the arched steel fiber for reinforcement of the cement-based material are bent, respectively, and the main body is arched along a length direction thereof so that the steel fiber can provide much higher pullout resistance strength compared to the conventional steel fiber, and mechanical performance such as tensile strength, flexural strength, energy absorption capability, and the like can be improved.

In particular, unlike the conventional hooked steel fiber of which pullout resistance strength is significantly reduced at straight ends after the hooked portion, the arched steel fiber for reinforcement of the cement-based material can maintain the pullout resistance strength because the entire length of the arched steel fiber resists a pullout load.

In addition, in case of a conventional semi-circular shaped steel fiber, fibers are balled when being mixed into a cement compound, thereby causing a problem in workability, and high friction occurs in a cement matrix when the fiber is pulled out from the cement-based compound, thereby requiring higher tensile strength than a steel wire, which is used in general so as to improve pullout performance.

However, the arched steel fiber for reinforcement of cement-based material according to the exemplary embodiment of the present invention has an appropriate curvature radius so that the fiber can be pulled out from the cement matrix and thus higher level tensile strength is not additionally required, and workability can be improved. Accordingly, the arched steel fiber for reinforcement of cement-based material according to the exemplary embodiment of the present invention can supplement drawbacks of the conventional hooked, circular-shaped, and semi-circular-shaped steel fiber and highlight merits thereof.

Further, compared to the conventional steel fiber for reinforcement of a cement-based material, the arched steel fiber for reinforcement of cement-based material according to the exemplary embodiment of the present invention can drastically reduce a mixing amount of the steel fiber compared to performance, thereby obtaining technical effects such as creating added economical value in terms of consumable cost.

In addition, the arched steel fiber for reinforcement of cement-based material according to the exemplary embodiment of the present invention can secure the durability for extending the life of the cement composite structure from the elasticity of the main body and improve manufacturing and productivity due to the simple construction of the structure.

MODE FOR INVENTION

Hereinafter, a technical configuration of arched steel fiber for reinforcement of a cement-based material according to an exemplary embodiment of the present invention will be described in detail with reference to the accompanying drawings.

Figure 1:
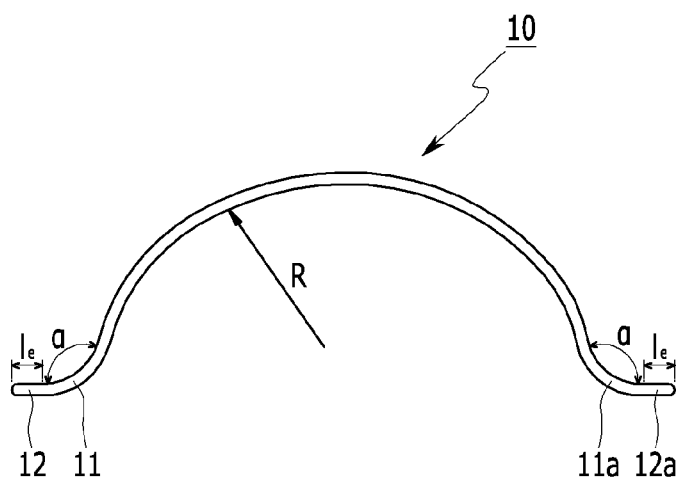
FIG. 1 shows arched steel fiber for reinforcement of a cement-based material according to a first exemplary embodiment of the present invention.
Figure 2:
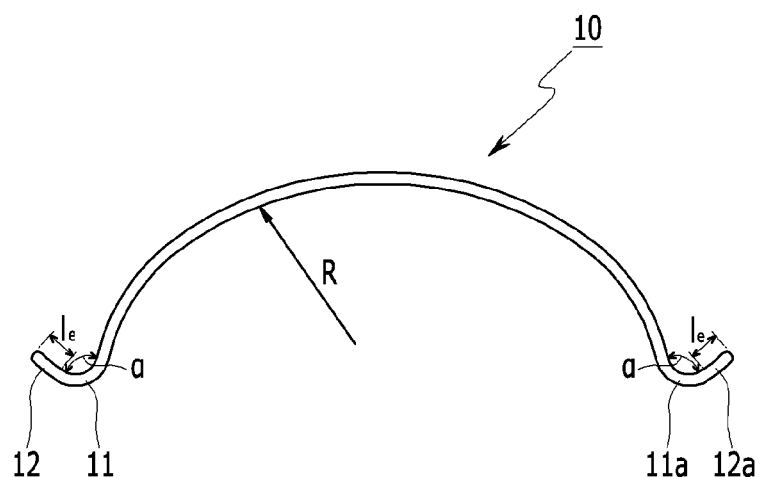
FIG. 2 shows arched steel fiber for reinforcement of a cement-based material according to a second exemplary embodiment of the present invention.
Figure 3:
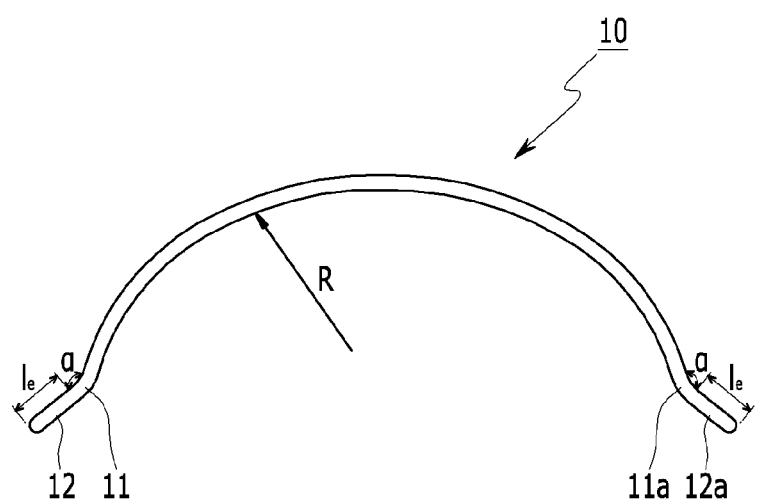
FIG. 3 shows arched steel fiber for reinforcement of a cement-based material according to a third exemplary embodiment of the present invention.

First, as shown in FIG. 1 to FIG. 3, arched steel fiber for reinforcement of a cement-based material according to an exemplary embodiment of the present invention includes an arched main body 10 and predetermined curved ends 11 and 11a and straight ends 12 and 12a that are respectively provided at opposite ends of the main body 10.

The curved ends 11 and 11a and the straight ends 12 and 12a are respectively integrally provided at the opposite ends of the main body 10. That is, the curved portions 11 and 11a are formed with a predetermined angle α and the straight ends 12 and 12a are formed with a predetermined length $l_e$, respectively, at the opposite ends of the main body 10.

The arched main body 10 provides stronger pullout resistance strength compared to a conventional art, and ultimately, provides a technical effect of improving mechanical performance such as tensile strength, flexural strength, energy absorption capability, and the like of the cement composite.

In particular, the curved ends 11 and 11a of the arched steel fiber for reinforcement of the cement-based material according to the exemplary embodiment of the present invention are bent in a direction that is opposite to the arch-shape of the main body 10.

In this case, the straight portions 12 and 12a are respectively extended from the curved portions 11 and 11a.

The arched main body 10 may have a predetermined curvature radius R. For example, the curvature radius R of the main body 10 may have various values between 5 mm and 80 mm. Here, a straight length of the steel fiber may be changed depending on the arch curvature radius R of the main body 10.

A total length of the steel fiber, that is, the total length of the main body 10, the curved ends 11 and 11a, and the straight ends 12 and 12a, may be set within a range of 10 mm to 90 mm to obtain a tensile strength of 500 MPa to 2800 MPa and a tensile elastic coefficient of 200 GPa or more.

When the curvature radius R of the main body 10 is 5 mm or less, the entire size of the steel fiber is reduced so that it is difficult to expect elasticity from the arched shape, and when curvature radius R of the main body 10 exceeds 80 mm, an elastic synergistic effect of the plurality of steel fibers may be deteriorated due to the total length.

The angle α of the curved ends 11 and 11a may vary within a range of 30° to 160°.

In addition, the length $l_e$ of the straight ends 12 and 12a may preferably be set to be within a range of 0.5 mm to 10 mm.

Here, The angle α of the curved ends 11 and 11a or the length $l_e$ of the straight ends 12 and 12a has a close relationship with mechanical adhesion performance in concrete when the arched steel fiber is mixed with a corresponding cement-based material.

When the angle α of the curved ends 11 and 11a is less than 30° or exceeds 160°, or when the length $l_e$ of the straight ends 12 and 12a is less than 0.5 mm, the mechanical adhesion performance in the corresponding concrete is only somewhat enhanced. Further, when the length $l_e$ of the straight ends 12 and 12a is set to be longer than 10 mm, unnecessary waste of materials may occur.

Exemplary Embodiment 1

In order to determine adhesion performance of the arched steel fiber for the cement-based material according to the exemplary embodiment of the present invention, a pullout test was performed on the arched steel fiber for the cement-based material according to the exemplary embodiment of the present invention and conventional hook-type steel fiber for the cement-based material.

In order to perform the pullout test, a dog-bone-shaped mortar specimen was divided into two portions according to JCI SF-8, and then a steel fiber was embedded 25 mm into each center of the divided portions.

Compression strength of the mortar was 30 MPa, and steel fibers used in the pullout test each had a tensile strength of 1300 MPa, a diameter of 0.75 mm, and a length of 60 mm.

In manufacturing of the arched steel fiber for reinforcement of the cement-based material according to the exemplary embodiment of the present invention, a curvature radius R of the arch was set to 35 mm, the angle α of the curved ends 11 and 11a was set to 90°, and the length $l_e$ of the straight ends 12 and 12a was set to 1.5 mm.

Figure 4:
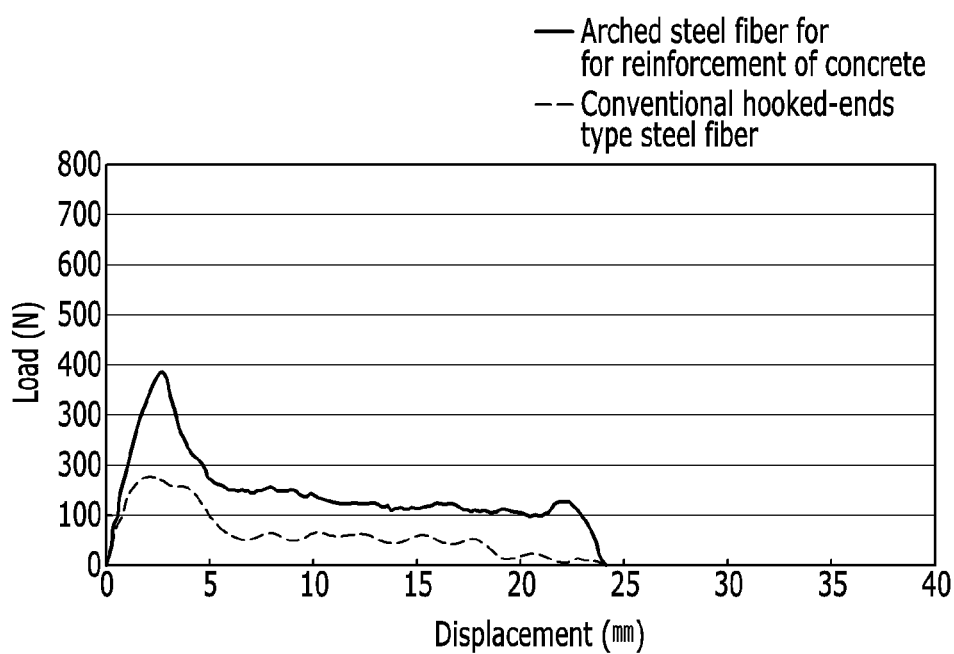
FIG. 4 and FIG. 5 are graphs that show results of a pullout test performed on the arched steel fiber for reinforcement of the cement-based material according to the exemplary embodiment of the present invention.

Results of the pullout test, as shown in the graph of FIG. 4, shows that a maximum pullout load of the arched steel fiber for reinforcement of the cement-based material according to the exemplary embodiment of the present invention is improved by 115% compared to the conventional steel fiber for reinforcement and a pullout resistance strength after the maximum pullout load is improved by 125%.

A result of observation of the surface of the arched steel fiber for reinforcement of the cement-based material according to the exemplary embodiment of the present invention shows that friction marks with a cement matrix remain all over the embedded length of the steel fiber, but in case of the conventional steel fiber for reinforcement, the friction marks remain only in a hook portion. Accordingly, it can be determined that the entire length of the arched steel fiber for reinforcement of the cement-based material according to the exemplary embodiment of the present invention resists the pull-out.

Exemplary Embodiment 2

In order to determine adhesion performance according to the length $l_e$ of the straight lines 12 and 12a of the arched steel fiber for reinforcement of the cement-based material according to the exemplary embodiment of the present invention, a pullout test was performed with the length $l_e$ of the straight lines 12 and 12a as a variable.

A pullout test method, an embedment length, and a compression strength of mortar were set to be the same as those of Exemplary Embodiment 1, and steel fibers used in the pullout test were prepared with a tensile strength of 1300 MPa, a diameter of 0.75 mm, and a length of 60 mm. The lengths $l_e$ of the straight ends 12 and 12a were respectively set to 0, 1.5 mm, 2.5 mm, and 3.5 mm.

Figure 5:
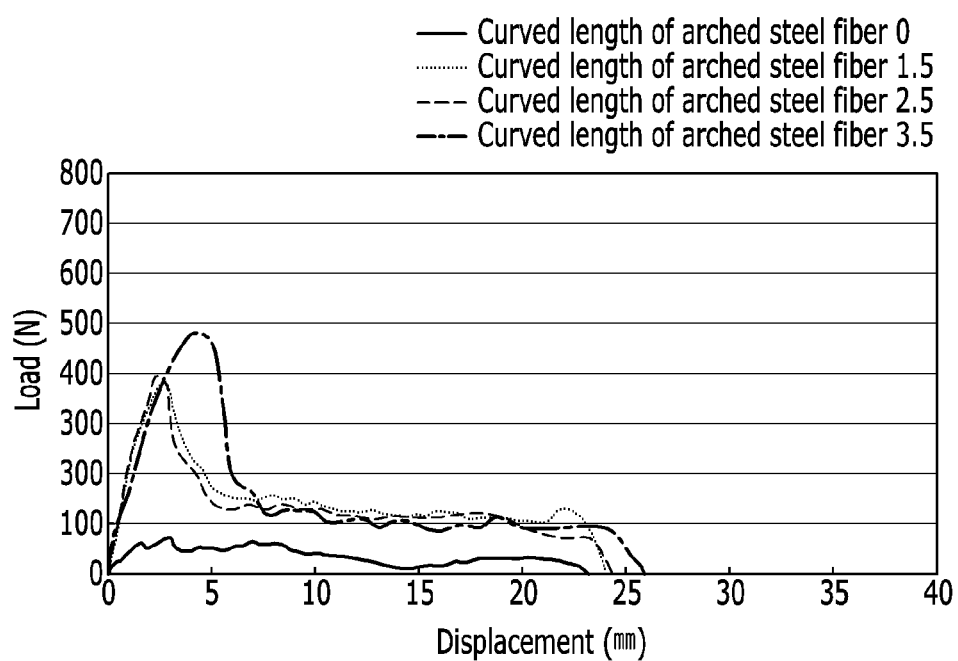

As shown in the results of the pullout test, represented by the graph of FIG. 5, maximum pullout loads of the straight ends 12 and 12a were improved by 437%, 450%, and 575%, respectively, when the lengths $l_e$ of the straight ends 12 and 12a were set to 1.5 mm, 2.5 mm, and 3.5 mm, respectively, with reference to 0 mm of the length $l_e$ of the straight ends 12 and 12a, and pullout resistance strengths after the maximum pullout loads were improved by 102%, 110%, and 122%, respectively.

Exemplary Embodiment 3

In order to determine bending performance of concrete reinforced by the arched steel fiber according to the exemplary embodiment of the present invention, bending performance was tested on the arched steel fiber, the conventional hook-type steel fiber, and circular-shaped steel fiber.

A specimen used in the test was manufactured as a 150 mm×150 mm×550 mm specimen having a prismatic shape, and a third-point bending test was performed according to JSCE-SF4.

Table 1 shows a mixing ratio of concrete for determination of bending performance, and steel fiber that has the same specification as of the arched steel fiber of Exemplary Embodiment 1 for the pullout test and the hooked-type steel fiber were applied, and in the case of the circular-shaped steel fiber, the tensile strength was 1300 MPa, the diameter was 0.75 mm, and the interior diameter was 30 mm. A mixing amount was 30 kg/m$^2$.

TABLE 1

| Design standard Compression strength (MPa) | Coarse aggregate Maximum size (mm) | Air amount (%) | S/a (%) | W/C (%) | Unit material amount (kg/m$^3$) | | | High performance AE water reducing agent (standard) (AD) |
| --- | --- | --- | --- | --- | --- | --- | --- | --- |
| | | | | | Water (W) | Cement (C) | Fine aggregate (S) | Coarse aggregate (G) | |
| 24 | 25 | 5 | 47.8 | 47.1 | 173 | 367 | 846 | 924 | 5.32 |

Compression strength was measured after being aged for 28 days, and a result of the measurement shows that the conventional hook-type steel fiber, the circular-shaped steel fiber, and the arched steel fiber for reinforcement of the cement-based material according to the exemplary embodiment satisfied the design standard compression strength.

Figure 6:
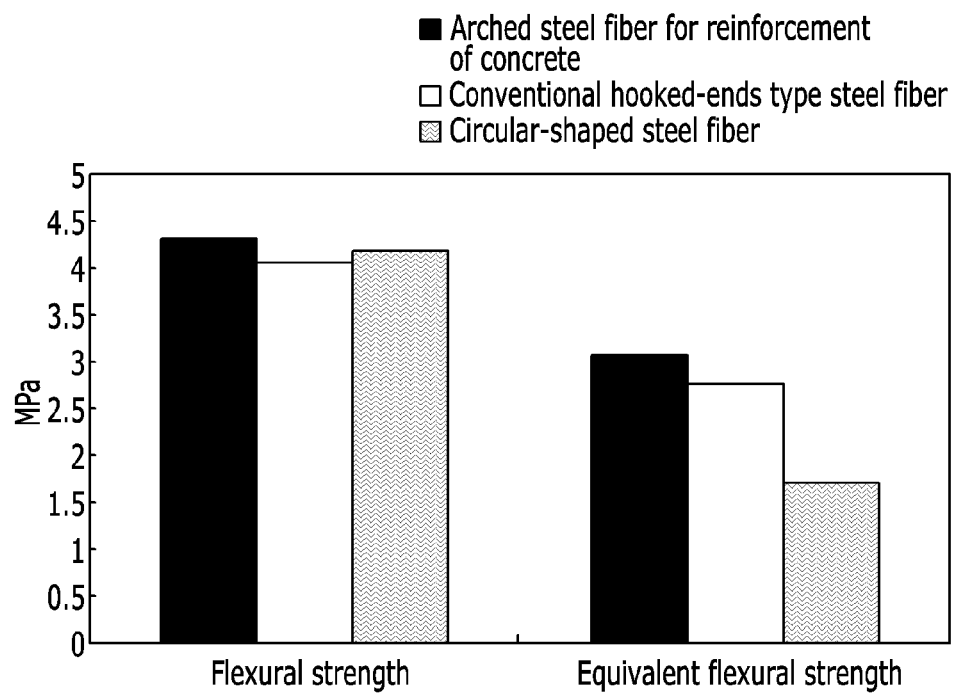
FIG. 6 is a graph that shows a result of a bending test performed on the arched steel fiber for reinforcement of the cement-based material according to the exemplary embodiment of the present invention.
Figure 7:
FIG. 7 shows steel fiber for reinforcement of a cement-based material according to a conventional art.

As shown in the graph of FIG. 6, a bending test result shows that flexural strength of concrete reinforced with the conventional hook-type steel fiber was 4.045 MPa, flexural strength of concrete reinforced with the conventional circular-shaped steel fiber was 4.178 MPa, and concrete reinforced with the arched steel fiber of the present invention was 4.302 MPa, and equivalent flexural strengths were respectively 2.751 MPa, 1.709 MPa, and 3.057 MPa, respectively.

That is, compared to the conventional hook-type steel fiber and the conventional circular-shaped steel fiber, flexural strength of the arched steel fiber for reinforcement of the cement-based material according to the exemplary embodiment of the present invention was improved by 6.35% and 2.97%, and the equivalent flexural strength was improved by 11.1% and 78.9%.

In the concrete reinforced with the arched steel fiber for reinforcement of the cement-based material according to the exemplary embodiment of the present invention and in the concrete reinforced with the conventional hook-type steel fiber, deflection of the specimen and weight loss did not significantly occur after the first crack. However, in the case of the concrete reinforced with the circular-shaped steel fiber, the specimen was deflected and load loss significantly occurred as the steel fiber rupture occurred after the first crack.

Hereinabove, the arched steel fiber for reinforcement of the cement-based material was described as an exemplary embodiment of the present invention for convenience of description, however, it is to be understood that the invention is not limited to the disclosed embodiments, but, on the contrary, is intended to cover various modifications and equivalent arrangements included within the spirit and scope of the appended claims.

The invention claimed is:
1. An arched steel fiber for reinforcement of a cement-based material, comprising an arched main body having a curvature radius R, curved ends respectively formed integrally at opposite ends of the main body, and a straight end extending from each of the curved ends,
- wherein the curved ends are bent in a direction that is opposite to a direction that the main body is arched, and the straight ends are continued to the curved ends, respectively,
- the curvature radius R of the main body is 5 mm to 80 mm,
- a total length of the main body, the curved ends, and the straight ends is 10 mm to 90 mm,
- a length of the straight end is 0.5 mm to 10 mm,
- an angle of the curved end is 30° to 160°,
- a tensile strength of the arched steel fiber is 500 to 2800 MPa, and
- a tensile elastic coefficient of the arched steel is 200 GPa or more.

\* \* \* \* \*